United States Patent
Huang et al.

(10) Patent No.: US 10,313,377 B2
(45) Date of Patent: Jun. 4, 2019

(54) UNIVERSAL LINK TO EXTRACT AND CLASSIFY LOG DATA

(71) Applicant: Anomali Incorporated, Redwood City, CA (US)

(72) Inventors: Wei Huang, Los Altos Hills, CA (US); Yizheng Zhou, Cupertino, CA (US); Hugh Seretse Njemanze, Redwood City, CA (US); Zhong Deng, San Jose, CA (US)

(73) Assignee: Anomali Incorporated, Redwood City, CA (US)

( * ) Notice: Subject to any disclaimer, the term of this patent is extended or adjusted under 35 U.S.C. 154(b) by 136 days.

(21) Appl. No.: 15/298,150

(22) Filed: Oct. 19, 2016

(65) Prior Publication Data
US 2018/0109550 A1  Apr. 19, 2018

(51) Int. Cl.
G06F 16/245 (2019.01)
H04L 29/06 (2006.01)
G06F 16/28 (2019.01)
G06F 21/00 (2013.01)

(52) U.S. Cl.
CPC ........ *H04L 63/1425* (2013.01); *G06F 16/245* (2019.01); *G06F 16/285* (2019.01); *H04L 2463/121* (2013.01)

(58) Field of Classification Search
CPC .................. H04L 63/1425; G06F 17/30424
USPC .................................................... 726/22–25
See application file for complete search history.

(56) References Cited

U.S. PATENT DOCUMENTS

| | | | |
|---|---|---|---|
| 9,118,702 B2 | 8/2015 | Macaulay | |
| 9,319,382 B2 | 4/2016 | Don, Jr. et al. | |
| 2008/0313708 A1 | 12/2008 | Khan | |
| 2013/0291087 A1* | 10/2013 | Kailash | H04L 63/1425 726/11 |
| 2015/0281176 A1 | 10/2015 | Banfield | |
| 2017/0180403 A1* | 6/2017 | Mehta | H04L 63/1416 |
| 2017/0279803 A1* | 9/2017 | Desai | H04L 63/0884 |

FOREIGN PATENT DOCUMENTS

WO   WO2015200211   12/2015

* cited by examiner

*Primary Examiner* — Anthony D Brown
(74) *Attorney, Agent, or Firm* — Van Pelt, Yi & James LLP

(57) ABSTRACT

A universal link to extract and classify log data is disclosed. In various embodiments, a set of candidate data values that match a top level pattern that is common to two or more types of data value of interest is identified. The candidate data values are processed through a plurality of successive filtering stages, each stage of which includes determining which, if any, of said candidates match a more specific pattern associated more specifically with a specific data value type. Candidates, if any, which match the more specific pattern are classified as being of a corresponding specific data type and are removed from the set of candidate data values. A structured data record that associates each candidate data value determined to be of a corresponding one of said types of data value of interest with said corresponding one of said types of data value of interest is generated and stored.

20 Claims, 12 Drawing Sheets

UNIVERSAL LINK TO EXTRACT AND CLASSIFY LOG DATA

BACKGROUND OF THE INVENTION

Firewalls, servers, client systems, and other systems, nodes, and agents collect extensive log data reflecting the activities of a given computer, user, and/or other network entity, including the interaction of such entities with other internal and external resources, system, etc. For example, network interactions between a client system and internal and external network destinations, such as web page views, file or other object downloads, messages exchanged with other nodes via various communication protocols, etc. may be logged and reflected in "traffic" or "access" log data.

Tools and services exist to identify known or potential malicious web sites, computers, domains, etc. A wide variety of such services exist, and an enterprise or other user or group of users may use more than one service to ensure potential or actual security breaches are detected. Such services may identify known or potentially malicious entities by IP (or other) address and/or by domain or sub-domain name, URL, email addresses, file hashes, etc. At any given time, the set of such known or potentially malicious IP addresses, domains, etc. may number in the many millions.

Network owners and/or security administrators use tools to detect when users of computers on their network access known or potential malicious sites and/or computers. However, computers associated with a given network may generate logs in a wide variety of formats. To date, such tools have required connectors or other software specific to each different type of computer to parse log data and populate a corresponding structured database, which is then able to be used to search, for example, for data associated with known threats, such as known or potentially malicious domains and IP addresses. Typically, a regular expression or other code to extract information must be provided for each log line type. Tools that depend on log format specific connectors may not be able to keep up with changes to log formats, e.g., resulting from client or other source system updates, and/or new log formats associated with newly-deployed systems.

BRIEF DESCRIPTION OF THE DRAWINGS

Various embodiments of the invention are disclosed in the following detailed description and the accompanying drawings.

DETAILED DESCRIPTION

Figure 1:
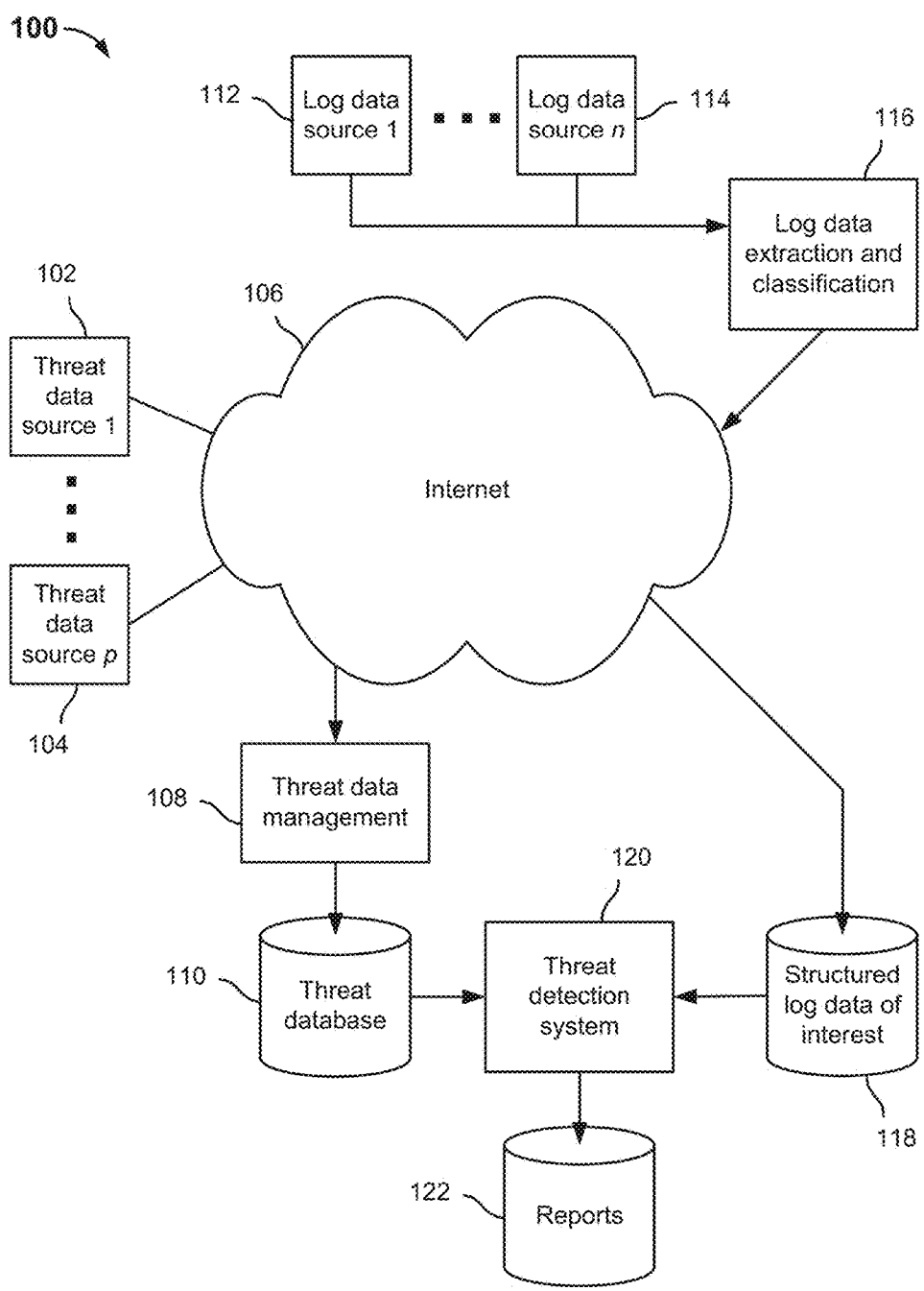
FIG. 1 is a block diagram illustrating an embodiment of a system and environment to detect network breaches.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A universal link to extract and parse log data, e.g., to facilitate threat or breach detection, regardless of log data source or format, is disclosed. In various embodiments, log data is parsed line-by-line. A cascading filter or sieve approach is employed, by which a set of candidate data values that match a high level pattern are identified, and subsequently increasingly more specific patterns are used to classify candidate values, as matches are found. As a candidate is classified, the candidate is removed from the candidate set, enabling a next successive pattern to be used to identify and classify other candidates that remain in the set. One or more heuristics may be applied to further and/or more specifically classify a candidate. For example, in some embodiments, if two or more candidate data values are found to match a pattern associated with IP addresses, one or more heuristics may be applied, according to a hierarchy in some embodiments, to further and more specifically classify one or more of the values as a "source" IP address or a "destination" address.

In various embodiments, candidates not classified once a last applicable filter/sieve (e.g., pattern, heuristic, etc.) is applied may be discarded. In various embodiments, data values extracted and classified as disclosed herein may be checked against a database or known threats, such as known or potentially malicious IP addresses, domains, etc., to detect and identify associated network interactions that are potential breaches of network security.

FIG. 1 is a block diagram illustrating an embodiment of a system and environment to detect network breaches. In the example shown, system and environment 100 includes a plurality of threat data sources, represented in FIG. 1 by threat data sources 102 and 104, which in this example are connected via the Internet 106, and/or one or more other private and/or public networks, to a threat data management system 108. Threat data management system 108 may comprise one or more servers, a server cluster, or other computers configured to receive threat data from threat data sources, such as threat data sources 102 and 104, and to combine data from such sources to populate a threat database 110. For example, threat database 110 may include merged lists of domains, IP addresses, user names, email addresses, and/or other identifiers that have been identified and reported by threat data sources 102, 104 as being suspicious, known or suspected of being malicious, etc.

Referring further to FIG. 1, system and environment 100 includes a set of log data sources, represented in FIG. 1 by log data sources 112 and 114. Examples of log data sources include, without limitation, client computer systems and/or devices, such as smart phones, tablets, laptops, etc.; corporate or other enterprise servers; proxy servers; firewalls, intrusion detection systems, and/or other security systems; etc. In the example shown, log data sources 112, 114 report log data via the Internet 106, and/or one or more other private and/or public networks, to a log data extraction and classification system 116. In various embodiments, the format, encoding, and/or content of log data provided by log data sources such as sources 112 and 114 may vary from reporting system to reporting system. A given system may use one of a plurality of standards-based formats, such as Common Event Format or Common Log Format; a proprietary format; and/or a proprietary or otherwise arbitrary implementation and/or customization of a standard format. In addition, for a given reporting system, the format and/or content may change over time, e.g., as the underlying system is updated. Log data may be received in the form of log files or may be streamed.

In various embodiments, log data extraction and classification system 116 may comprise one or more servers, server cluster, or other computer configured to receive log data, in file, stream, or other form, via a communication interface, such as a network interface card. File data may be stored in memory or other data storage to be processed. A processor may be configured, e.g., by software or other instructions, to parse, extract, and classify log data as disclosed herein. In various embodiments, a "universal link" module, entity, code, etc. may be used to process arbitrary log data. Log data may be processed line by line in a manner that is not specific to any particular form, format, or content of the log data. In various embodiments, for each log line, the universal link module or other entity may identify a set of candidate data values of interest, e.g., by identifying values that match a high level pattern. In some embodiments, a regular expression may be used to perform pattern matching. For example, to find candidates that may be IP addresses, domain names, and the like, regular expressions such as the following illustrative and non-limiting examples may be used:

IP(v4): (?<![0-9])(?:(?:[0-1]?[0-9]{1,2}|2[0-4][0-9]
|25[0-5])[.](?:[0-1]?[0-9]{1,2}|2[0-4][0-9]|25[0-5])[.](?:[0-1]?[0-9]{1,2}|2[0-4][0-9]|25[0-5])[.](?:[0-1]?[0-9]{1,2}|2[0-4][0-9]|25[0-5]))(?![0-9])

Domain Name: (((\[a-zA-Z0-9]|[a-zA-Z0-9][a-zA-Z0-9\-]*[a-zA-Z0-9])\.)+(XN|xn\-\-[a-zA-Z0-9]+|[A-Za-z+])

IP(v4) and Domain Name: (?:%{IP}|%{DOMAIN})

In various embodiments, successive levels of pattern matching may be performed to identify specific values from among the candidate values. For example, one or more candidates may be determined to comprise IP addresses. Candidates that have been classified may be removed from the set of candidates. Heuristics, rules, regular expressions and/or other techniques may be used to further and more specifically identify candidates that have been determined to comprise IP addresses, in this example. Remaining candidate values may be processed through subsequent, successive iterations of classification until all values of interest have been classified. Remaining candidates, i.e., those that have not been identified and classified as being of interest, may then be discarded.

In the example shown in FIG. 1, log data extraction and classification system 116 stores in "structured log data of interest" database 118, for each log line that is processed, a corresponding structured data record in which at least the data values of interest and for each its associated classification (e.g., source IP address) are indicated. In various embodiments, each record may include a timestamp extracted from and/or otherwise associated with the log line. In various embodiments, log data extraction and classification system 116 may be configured to aggregate and compress a subset of log data that may be of interest, reducing the delay and other costs associated with sending log data via the Internet 106.

Referring further to FIG. 1, in the example shown threat detection system 120 uses threat data from threat database 110 to detect in structured log data of interest 118 those records (if any) that include data associated with a threat. For example, threat detection system 120 may search in structured log data of interest 118 for records that include an IP address, domain, etc., which is identified in threat database 110 as being suspicious, known to be malicious, etc. Threat detection system 120 may generate one or more reports, alerts, etc., such as "breach" reports that include a suspicious or malicious IP (or other) address, domain, etc., and may store such reports in a report database 122.

Threat detection system 120 may comprise a server or other computer that includes a communication interface to access threat data (110) and/or receive structured (or unstructured) log data (118); a memory and/or other data storage to store threat data and/or log data while processing; and one or more processors configured to perform breach detection as described herein.

While threat data management system 108, log data extraction and classification system 116, and threat detection system 120 are shown as separate systems in FIG. 1, in various embodiments one or more of them may be included in a single physical and/or logical system, such as a single server or other computer. For example, each system 108, 116, 120 may comprise an application, module, or other software entity running on a same physical and/or logical computer system.

Figure 2:
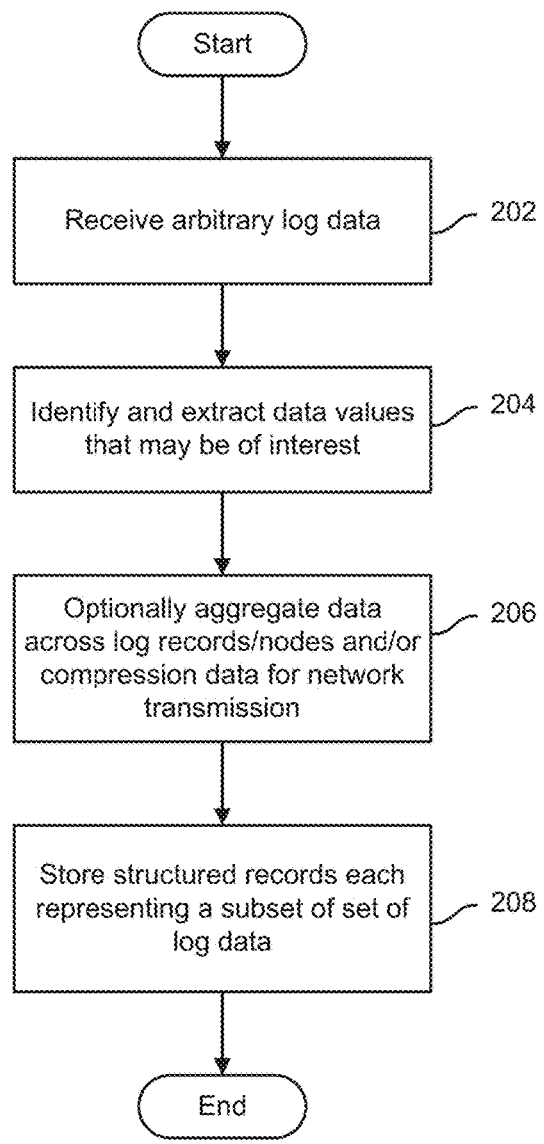
FIG. 2 is a flow chart illustrating an embodiment of a process to extract and classify data values of interest from arbitrary log data.

FIG. 2 is a flow chart illustrating an embodiment of a process to extract and classify data values of interest from arbitrary log data. In various embodiments, the process of FIG. 2 may be implemented by a log data extraction and classification system, such as log data extraction and classification system 116 of FIG. 1. In the example shown, arbitrary log data is received (202). The log data may be "arbitrary" in the sense that the process and/or the system implementing the process is/are able to process the log data regardless of the source system that generated the log data or the format and/or content of the data, as disclosed herein. Candidate values that may be of interest are identified and extracted from the log data (204). For example, top level pattern matching and/or other techniques may be used to identify values that may be of interest. Optionally, related sets of extracted log data of interest may be aggregated, e.g., across log lines from a single reporting node, across nodes, etc. For example, references to a particular URL, domain name, and/or other value potentially of interest may be aggregated into a single record (206). Optionally, extracted log data may be compressed for network transmission (206). Structured records, each representing a subset of the received log data (e.g., each record corresponding to a line of log data or a portion thereof) are stored (208), e.g., in a structured log data of interest database such as database 118 of FIG. 1.

Figure 3:
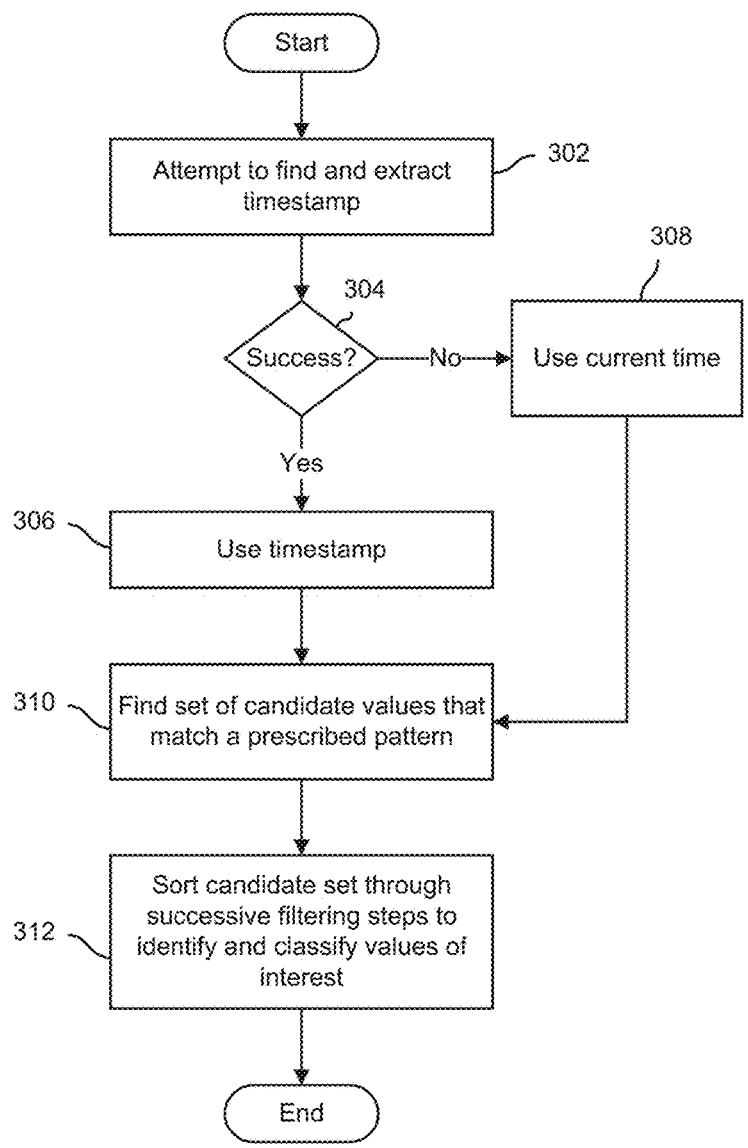
FIG. 3 is a flow chart illustrating an embodiment of a process to extract and classify data values of interest from arbitrary log data.

FIG. 3 is a flow chart illustrating an embodiment of a process to extract and classify data values of interest from arbitrary log data. In various embodiments, the process of FIG. 2 may be implemented by a log data extraction and classification system, such as log data extraction and classification system 116 of FIG. 1. In some embodiments, the process of FIG. 3 may be used to implement step 204 of the process of FIG. 2. In some embodiments, the process of FIG. 3 may be used to detect breaches associated with interactions by protected systems, such as client computer systems comprising an enterprise or other network, with systems associated with IP addresses, domains, etc. that have been identified as threats.

In the example shown in FIG. 3, processing of a log line (or other discrete set of log data) begins with an attempt to find and extract a timestamp (302). Log lines typically have a timestamp, but the location of the timestamp within the line (or other set) of log data varies, as does the format used to express the date and time. In various embodiments, a set of regular expressions and/or other pattern matching techniques may be used to locate and extract the timestamp. For example, the system/process may look for the timestamp first at the beginning of a log line. If a value corresponding to a known timestamp format is not detected at the beginning of the line, other data values in the line may be checked. Non-limited illustrative examples of regular expressions that may be used in various embodiments to identify a timestamp include the following:

TIMES TAMP: %{MONTH}+
      %{MONTHDAY}%{TIME}

MONTH \b(?:Jan(?:uary|uar)?|Feb(?:ruary|ruar)?|M
      (?:a|ä)?r(?:ch|z)?|Apr(?:il)?|Ma(?:y|i)?|Jun(?:e|i)
      ?|Jul(?:y)?|Aug(?:ust)?|Sep(?:tember)?|O(?:c|k)
      ?t(?:ober)?|Nov(?:ember)?|De(?:c|z)(?:ember)?)
      \b

MONTHDAY(?:(?:0[1-9])|(?:[12][0-9])|(?:3[01])|[1-
      9])

TIME(?!<[0-9])%{HOUR}:%{MINUTE}(?::%{SEC-
      OND})(?![0-9])

If a timestamp value is identified in the log data (304), the timestamp included in the log data is used (306). Otherwise (304), a current system time of a system implementing the process of FIG. 3 is used (308). In some embodiments, an extracted (306) or attributed (308) timestamp may be stored in a standard and/or normalized format, e.g., in a structured data record to be stored in a structured log data of interest database, such as database 118 of FIG. 1.

Referring further to FIG. 3, a set of candidate values that match a prescribed top level pattern is identified in the log data (310). For example, in an embodiment in which IP addresses and/or domain names may be associated with threats, data values comprising one or more occurrences of the pattern "[string or number].[string or number]" may be extracted and added to a set of candidate values. In various embodiments, regular expression such as those included in the illustrative examples provided above may be used. The candidate values in the set are sorted and classified through successive filtering steps to identify and classify values of interest (312). For example, candidate values may be checked first against a pattern associated with IP addresses. Candidates that match the IP address pattern may be classified as IP addresses and removed from the set. Remaining candidates may then be checked against a pattern, content, etc., associated with domain names, and so on, as described above.

Figure 4:
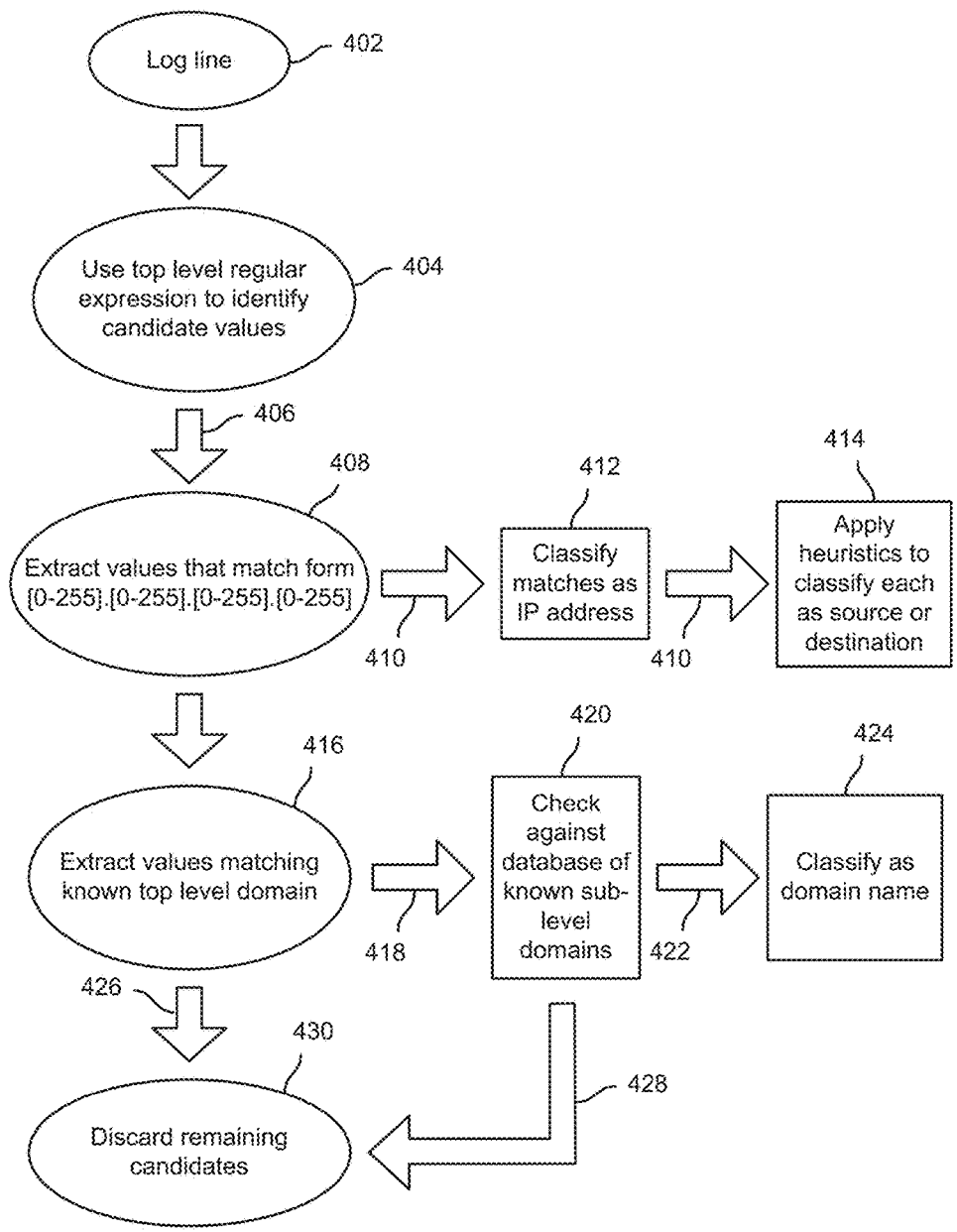
FIG. 4 is a functional flow diagram illustrating the processing of arbitrary log line data in an embodiment of a universal link-enabled log data processing system.

FIG. 4 is a functional flow diagram illustrating the processing of arbitrary log line data in an embodiment of a universal link-enabled log data processing system. In various embodiments, processing as illustrated in FIG. 4 may be implemented by a log data extraction and classification system, such as log data extraction and classification system 116 of FIG. 1, in various embodiments by implementing one or both of the processes of FIGS. 2 and 3, respectively. In some embodiments, the processing of FIG. 4 may be performed to implement steps 310 and 312 of the process of FIG. 3. In the example shown, a received log line 402 is processed using a top level regular expression (or other matching technique) 404 to identify a set of candidate values 406 that match the top level expression. Candidate values 410 that match a pattern associated with an IP address are extracted from the candidate set 408 and classified 412 as IP address values. One or more heuristics may be applied 414 to further classify one or more of the IP address values 410. For examples, one of the IP address values 410 may be determined to be a "source" IP address.

From the remaining set of candidate values, i.e., those remaining in the set once the candidate values determined to be IP addresses 408, 410, 412 have been removed from the original set 406, candidate values 418 that include a string that matches a known top level domain (e.g., ".com", ".ru", etc.) are extracted 416. In the example shown, the extracted values 418 are checked 420 against a database of known second and third level domains to yield a set of values 422 that are classified 424 to be domains. In various embodiments, checking candidate values 418 that match known top level domains against a database of known second and third level domains eliminates false positive results, thereby avoiding the use of computing resources to check such values against lists or other databases of domains determined to be threats. Candidates that don't match any pattern 426 and/or that match a top level domain pattern but not a known second or third level domain 428 are discarded 430.

Figure 5A:
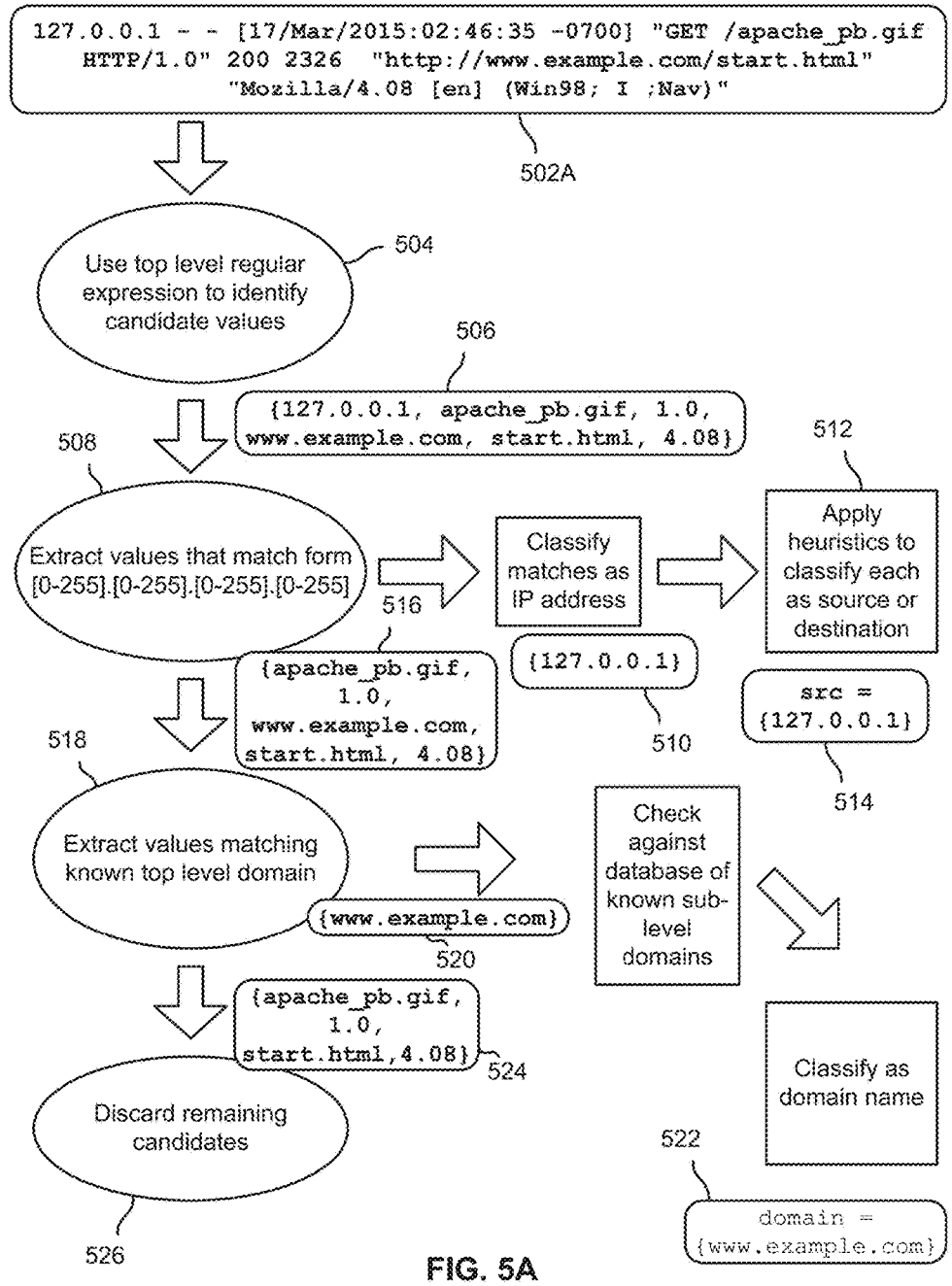
FIG. 5A is a diagram illustrating an example of extracting and classifying data values from a log line in an embodiment of a universal link-enabled log data processing system.

FIG. 5A is a diagram illustrating an example of extracting and classifying data values from a log line in an embodiment of a universal link-enabled log data processing system. In various embodiments, the example shown in FIG. 5A may be implemented using a process as illustrated in FIGS. 2, 3, and 4. In the example shown, a log entry 502A generated in Combined Log Format, a commonly used logging format, is received. For example, log entry 502A may be a log line read from a received log file and/or a log line received in a stream. A top level regular expression is used (504) to identify a set of candidate values (506) matching a [text].[text] pattern. In this example, set 506 includes an IP address, a filename, a version number, a domain, a page name, and another version number). Values that match an IP address pattern (508) are extracted from the set of candidates (506) and in this example the one value "127.0.0.1" matching the IP address pattern is classified as an IP address (510). One or more heuristics are applied (512) to further and more specifically classify the IP address (510). In this example, the log entry 502A does not include any express identifier associating the IP address (510) with either the source or destination. However, the IP address (510) in this example is designated a source IP address (514) due to its position within log entry 502A, i.e., at the beginning of the entry, and/or the fact that it is the only IP address identified in the entry.

The candidates (516) remaining after removal of the candidate (510) identified as an IP address are processed to extract values associated with a top level domain, e.g., ".com", etc. (518). In this example, the domain "www.example.com" (520) has been identified as a domain name candidate, and has been checked against a database of known sub-level domains to confirm its classification as a domain (522). In some embodiments, the domain (522) may be further identified as a "destination", e.g., by virtue of its position within the log entry 502A relative to the source IP address.

The candidate values (524) not classified as either an IP address or a domain, in this example, are discarded (526). The candidates classified as a source IP address (514) and a domain and/or destination (522) may be stored, in various embodiments, in a structured data record associating each value with its classification and the log entry 502A in which it occurred. The structured record may be identified, for example, by a timestamp extracted from log entry 502A. For example, the timestamp "[17/Mar/2015:02:46:35-0700]" may be extracted and associated with the structured data record. In some embodiments, the timestamp may be found by searching the log entry 502A for values that match one of a known, finite number of timestamp formats and/or may be determined as described above in connections with steps 302, 304, 306, and 308 of FIG. 3.

Figure 5B:
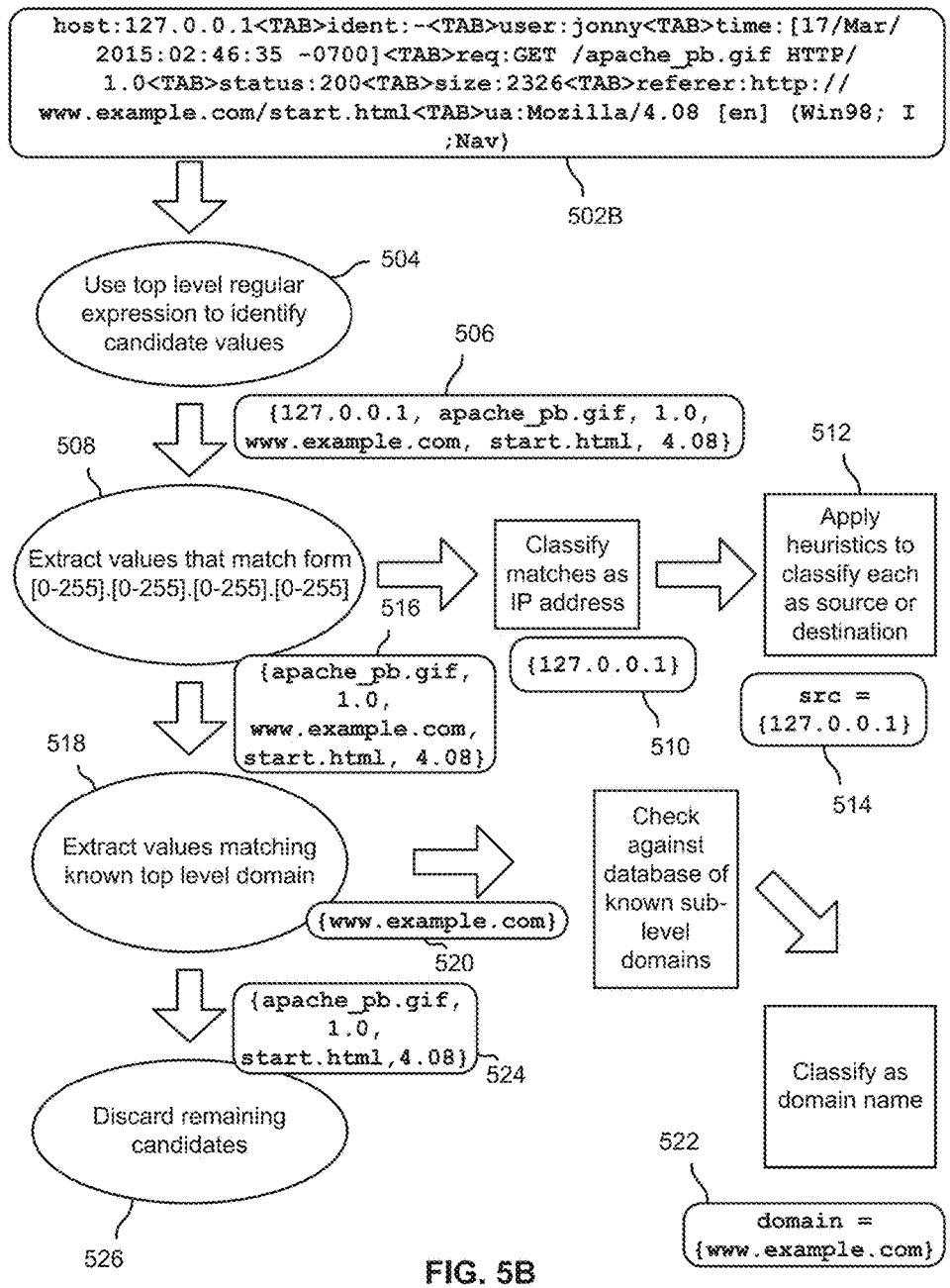
FIG. 5B is a diagram illustrating an example of extracting and classifying data values from a log line in an embodiment of a universal link-enabled log data processing system.

FIG. 5B is a diagram illustrating an example of extracting and classifying data values from a log line in an embodiment of a universal link-enabled log data processing system. In the example shown, a log entry 502B that includes the same information as in log entry 502A but expressed and represented in a different format, in this example the Labeled Tab-separated Values (LTSV) format, is received. As the example shown in FIG. 5B indicates, the remaining processing and all intermediate and final results of such processing are identical the corresponding and like-numbered processing steps and results shown in FIG. 5A.

A comparison of the examples shown in FIGS. 5A and 5B illustrates that the approach described herein may be used to generate a structured data record containing values of interest that have been extracted from arbitrary log data, regardless of the format used to express the log data. No prior knowledge of the format, schema, or content of the log entry, or the manufacturer, model, and/or configuration of the system that generated the log entry, is required.

Figure 5C:
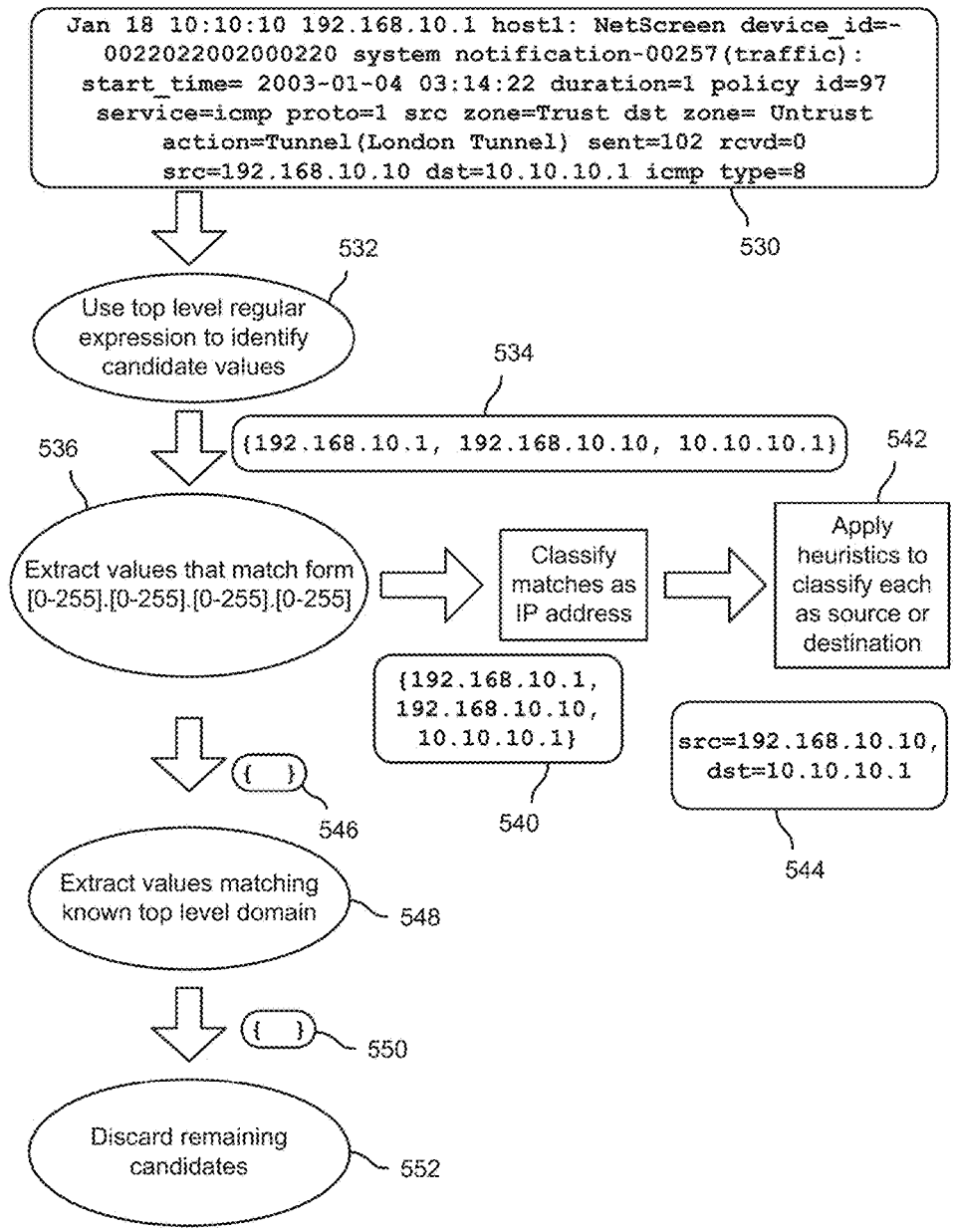
FIG. 5C is a diagram illustrating an example of extracting and classifying data values from a log line in an embodiment of a universal link-enabled log data processing system.

FIG. 5C is a diagram illustrating an example of extracting and classifying data values from a log line in an embodiment of a universal link-enabled log data processing system. In the example shown, a log entry 530 is received. A top level regular expression is applied (532) to identify a set of candidate values (534), as in the examples shown in FIGS. 5A and 5B. Values matching a pattern associated with an IP address are extracted (536). In this example, all three initial candidates (534) are identified as being IP addresses (540). One or more heuristics have been applied (542) to classify selected values as a source IP address and destination IP address, respectively (544). For example, a hierarchical or other ordered set of heuristics may have been applied. In this example, the value "192.168.10.10" is identified as the "source" IP address due to being preceded directly by the label "src=", despite not being the first IP address in the entry. In some embodiments, the first entry would have been identified as the "source" IP address if the label "src" or equivalent had not been present in log entry 530. In the example shown in FIG. 5C, only IP address candidates were present in the initial set of candidates (534), result in no further candidate values being available to be processed and/or classified as domain values or any other value (546, 548, 550, 552).

Figure 5D:
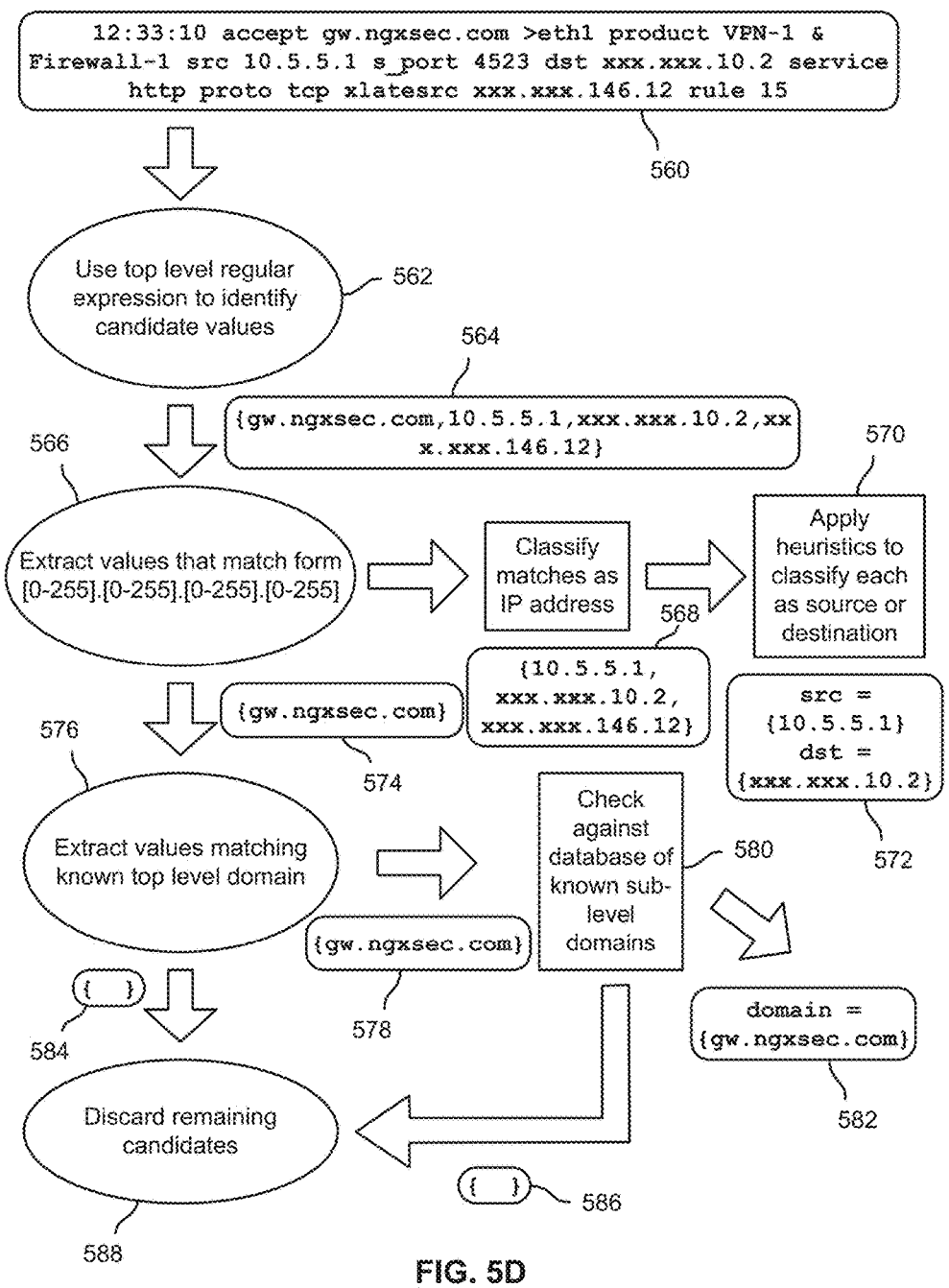
FIG. 5D is a diagram illustrating an example of extracting and classifying data values from a log line in an embodiment of a universal link-enabled log data processing system.

FIG. 5D is a diagram illustrating an example of extracting and classifying data values from a log line in an embodiment of a universal link-enabled log data processing system. In the example shown, a log entry 560 is received. A top level regular expression is applied (562) to identify and extract a set of candidate values (564). Values matching a pattern associated with IP addresses are identified and extracted (566) from the initial set of candidates (564). In the example shown, a set of three values has been identified and extracted from the initial set and classified as IP addresses (568). One or more heuristics have been applied (570) to further classify one of the values as a source IP address and another as a destination IP address (572). In this example, the values may have been classified as "source" and "destination", respectively, by virtue of having been preceded immediately by the labels "src" and "dst", respectively, in log entry 560. A remaining candidate (574) has been checked against a set of known top level domains (576) and as a result has been identified as a potential domain (578) and confirmed as a domain by checking the value (578) against a database of known second and third level domains (580, 582). In this example, all candidate values were classified as either an IP address or a domain and no further candidate values being available to be processed (584, 586, 588).

Figure 6:
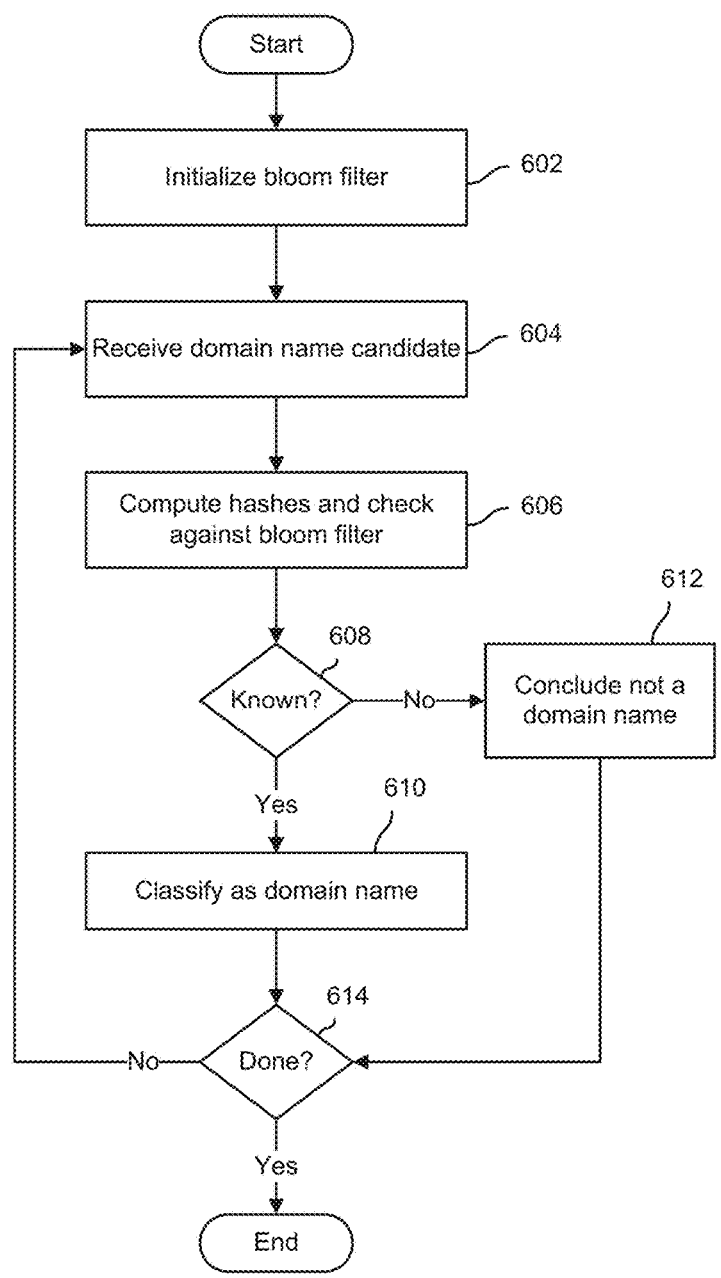
FIG. 6 is a flow chart illustrating an embodiment of a process to identify domain names among a set of candidate values.

FIG. 6 is a flow chart illustrating an embodiment of a process to identify domain names among a set of candidate values. In various embodiments, the process of FIG. 6 may be used to implement one or more of processing steps such as step 420 of FIG. 4 and/or corresponding steps of FIGS. 5A-5D. In the example shown, a bloom filter is initialized (602). A bloom filter is a storage space efficient and computation resource efficient structure or set of structures to accumulate data reflecting data values that have been seen previously. One or more hash values may be computed and each mapped to a corresponding location in a data structure, e.g., a single bit, which is set or verified to have been set previously to a "set" value (e.g., "1"). If a subsequently received/processed value is the same as one encountered previously, then all corresponding locations in the bit map will be found to have been set previously. If the bloom filter is of appropriate size and dimension (number of hashes/locations found and set per processed value) it is mathematically highly likely that the same value was processed previously. In some embodiments, initializing a bloom filter (602) includes pre-populated the bloom filter by setting values corresponding to known second and third level domains. While in some embodiments described herein a bloom filter is used to identify domain names from a set of candidate values, in various embodiments one or more other or different data structures and/or techniques may be used, such as a hash table or other data structure.

At runtime, e.g., of an instance of the process of FIGS. 3, 4, and/or 5A-5D, domain name candidates are received (604), e.g., as a result of having been determined to match a known first level domain (e.g., ".com", etc.). One or more hash values are computed based on data comprising the received data value and are checked against the bloom filter (606). If all corresponding values in the bloom filter have been set, the value is confirmed to be a known data value (608) and classified as such (610). If one or more of the corresponding bloom filter locations have not previously been set (606, 608), it is concluded that the value is not a domain name (612). Processing continues as above through subsequent iterations (614) until all received candidates have been processed, at which time the process of FIG. 6 ends.

Figure 7:
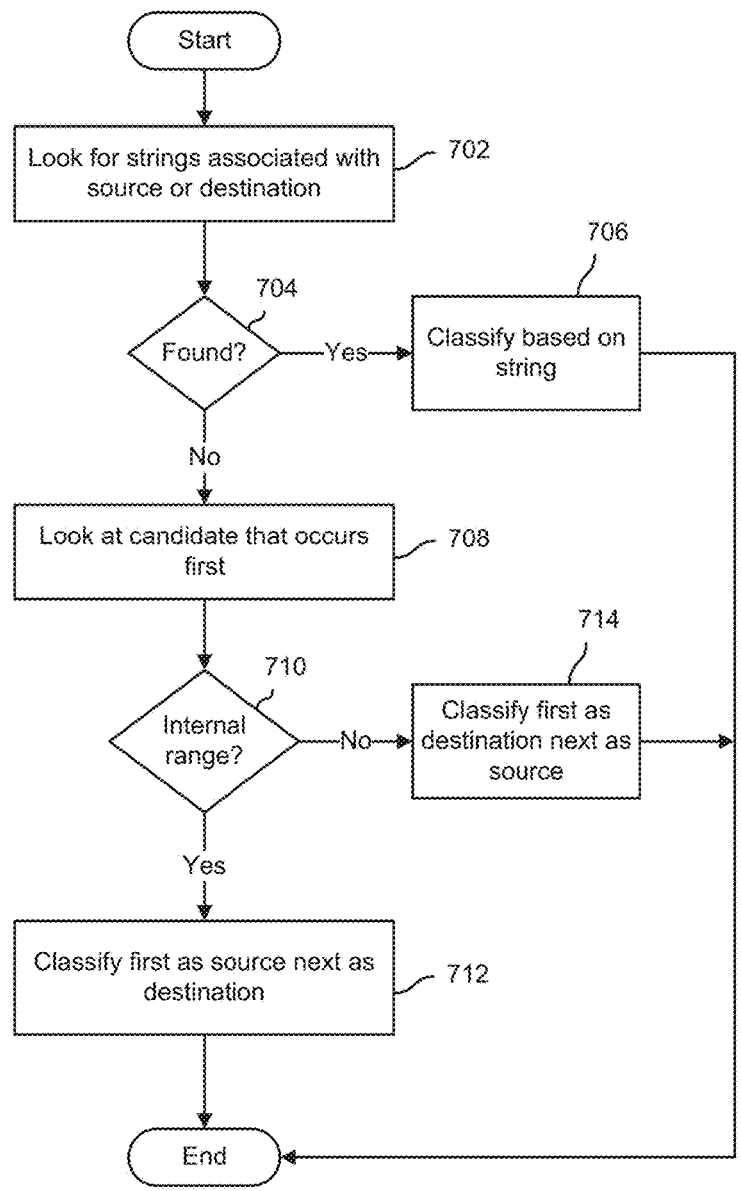
FIG. 7 is a flow chart illustrating an embodiment of a process to classify IP addresses included in a set of IP address candidate values.

FIG. 7 is a flow chart illustrating an embodiment of a process to classify IP addresses included in a set of IP address candidate values. In various embodiments, the process of FIG. 7 may be used to implement a hierarchical set of heuristics to further classify candidate values that have been identified as matching a pattern associated with IP addresses, as in step 414 of the process of FIG. 4. In the example shown, a log entry data from which a given IP address candidate has been extracted is checked for strings commonly associated with a "source" or "destination" IP address value (702). For example, the strings "src" and "dst" may be looked for, in addition to full words such as "source" or "destination". Synonyms, such as "target" (for destination), may be included in the search. If a string associated with either "source" or "destination" is found, then a corresponding candidate value, such as the value nearest and/or immediately following the string, is classified on that basis (706). If known identifier strings are not found (704), the process considers the candidate value that occurs first in the log entry (708). If the first-occurring IP address candidate value is in an internal IP address range (710), then the first-occurring candidate is classified as the "source" IP address (712), and a next-occurring IP address candidate (if present) is identified as the "destination" IP address. If the first-occurring IP address is not in an internal address range (710), the first-occurring address candidate is classified as a "destination" IP address and a next-occurring candidate is identified as the "source" IP address (714).

Figure 8:
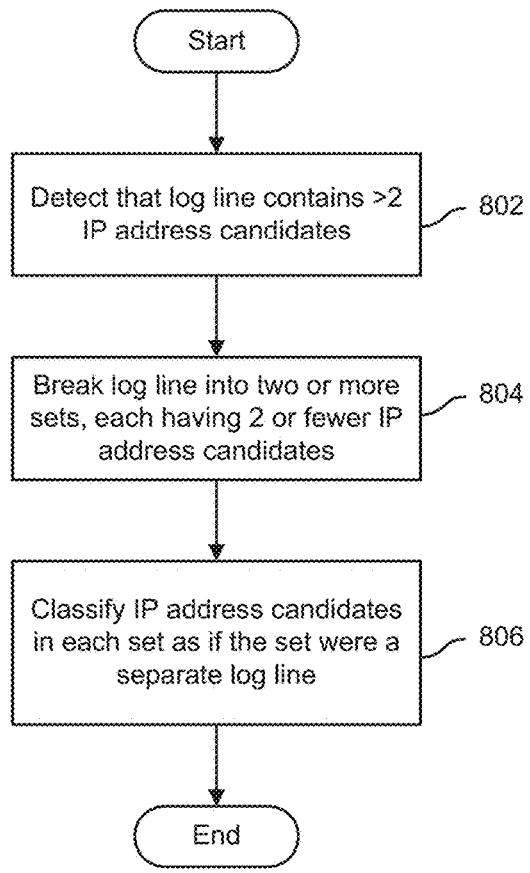
FIG. 8 is a flow chart illustrating an embodiment of a process to classify IP addresses included in a set of three or more IP address candidate values.

FIG. 8 is a flow chart illustrating an embodiment of a process to classify IP addresses included in a set of three or more IP address candidate values. In various embodiments, the process of FIG. 8 may be used to ensure that all values in a log entry that match an IP address pattern are included in a corresponding structured data record. Such an approach may be desired in environments in which some log entries and/or log entry formats may include IP addresses in addition to a source IP address and a destination IP address, such as a forwarding, proxy, and/or reporting system IP address. In the example shown, the presence in a log entry of two or more IP address candidates is detected (802). In response, the log line is broken into two or more sets of log data, each having two or fewer IP address candidates (804). Each set is then processed as if it were a separately-received line of log data (806). In some embodiments, processing as shown in FIG. 8 may result in misclassification of an IP address as a "source" or "destination" IP address. However, the misclassification can be identified and corrected later, if needed, e.g., in the event a structured data record so created results in an IP address being determined to match a threat, such as a known or suspected malicious IP address or range. For the (typically overwhelming number of) IP addresses that do not match a known threat, the potential misclassification would not matter, in an embodiment in which structured data records are created primarily to detect interactions with known threats.

Figure 9:
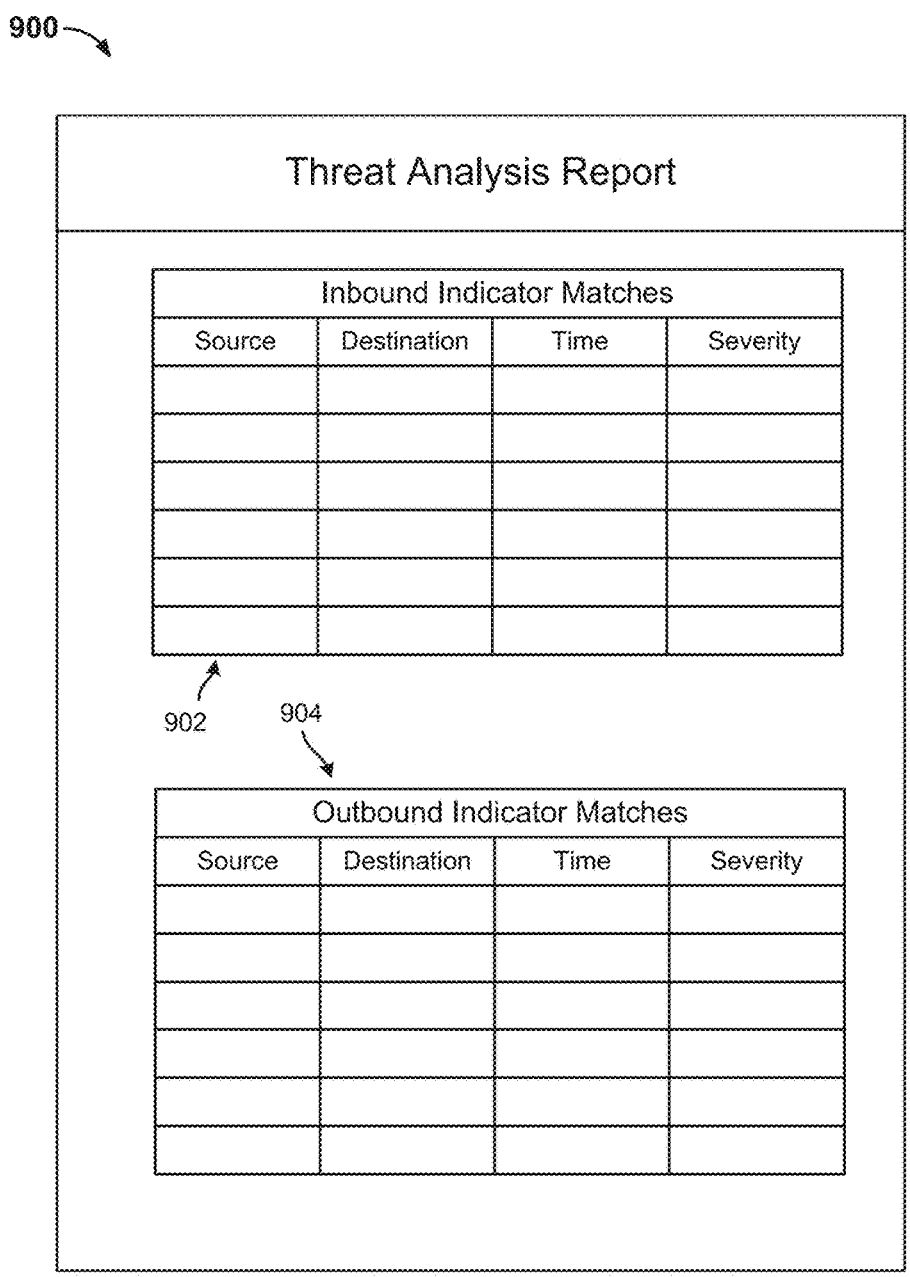
FIG. 9 is a diagram illustrating an example of a breach report in an embodiment of a universal link-enabled threat detection system.

FIG. 9 is a diagram illustrating an example of a breach report in an embodiment of a universal link-enabled threat detection system. In various embodiments, a report such as the one shown in FIG. 9 may be generated by a threat detection system, such as threat detection system 120 of FIG. 1, for example based on structured data records generated based on arbitrary log data as disclosed herein. In the example shown, threat analysis report 900 includes a first section 902 in which "inbound" threat indicator matches are listed, and a second section 904 in which "outbound" threat indicator matches are listed. Examples of inbound threat indicators include, without limitation, connections or attempts to connect to a protected computer by a suspicious remote system, e.g., a connection or request having a source IP address that matches a known threat. Examples of outbound threat indicators include, without limitation, connections or attempts to connect initiated by a protected system to a destination (e.g., destination IP address, domain) associated with a known threat.

As shown in FIG. 9, a threat analysis report may include, for each detected possible breach, a source indicator (e.g., source IP address), a destination indicator (e.g., destination IP address), a time (e.g., timestamp), a severity (e.g., very high, high, etc.), and/or other data and/or metadata values, such as a confidence score (e.g., how sure the system is that the record matches a threat and/or how sure the system is that the matched value is a threat), a connection/access type, etc.

While a number of examples discussed herein involve IP addresses, domain names, etc. that match the same top level regular expression, e.g., [text].[text], in other embodiments one or more other patterns may be applied at the top level instead of and/or in addition to the [text].[text] pattern. For example, potentially malicious email addresses may be detected by a system that employs a [text]@[domain] pattern to extract and classify email address values.

In various embodiments, techniques disclosed herein may be used to provide a "universal link" component capable of extracting and classifying data values of interest from arbitrary log data, without a priori knowledge of the format and/or content of the log data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory configured to store arbitrary log data; and
a processor coupled to the memory and configured to:

identify in said arbitrary log data a set of candidate data values that match a top level pattern that is common to two or more types of data value of interest;

process said candidate data values through a plurality of successive filtering stages, each stage of which includes determining which, if any, of said candidates match a more specific pattern associated more specifically with a specific one of said types of data value of interest; classifying said candidates, if any, that match the more specific pattern as being of said corresponding specific one of said types of data value of interest; and removing from the set of candidate data values any candidate data values so identified and classified; and generate and store a structured data record that associates each candidate data value determined to be of a corresponding one of said types of data value of interest with said corresponding one of said types of data value of interest;

wherein the processor is further configured to apply one or more heuristics to more specifically classify and label one or more values determined to match a pattern associated with a specific one of said types of data value of interest; and wherein said heuristics include heuristics based on one or more of presence in the arbitrary log data of a characteristic string; placement within the log data of such a string relative to a given candidate data value; location of a given candidate data value within the arbitrary log data; and location within the arbitrary log data of a given candidate data value relative to one or more other candidate data values of the same type.

2. The system of claim 1, wherein said arbitrary log data comprises a discrete set of log data.

3. The system of claim 2, wherein said arbitrary log data comprises a line of log data.

4. The system of claim 1, wherein the processor is configured to identify said set of candidate data value at least in part by applying a regular expression to text comprising said arbitrary log data.

5. The system of claim 1, wherein said arbitrary log data may include log data expressed and represented in any format.

6. The system of claim 1, wherein said arbitrary log data may include zero, one, or more occurrences of each of said types of data value of interest.

7. The system of claim 1, wherein said types of data value of interest include one or more of the following: an IP address type, a domain type, a URL type, and an email address type.

8. The system of claim 1, wherein the processor is further configured to discard candidate values comprising the set of candidate values that do not match any of said more specific patterns.

9. The system of claim 1, wherein the processor is further configured to detect that said arbitrary log data includes more than a prescribed threshold number of occurrences of data values of a given type, and to split the arbitrary log data into two or more sets each including the prescribed number or fewer occurrences of data values of said given type.

10. The system of claim 9, wherein the processor is configured to perform said recited steps to identify, process, and generate and store separately with respect to each set of log data generated by splitting the arbitrary log data into two or more sets.

11. The system of claim 1, further comprising a communication interface configured to receive said arbitrary log data.

12. The system of claim 1, wherein the processor is further configured to check a candidate data value determined to match a more specific pattern associated with a given type against a database of known values of that type.

13. The system of claim 12, wherein the processor is further configured to check said candidate data value determined to match a more specific pattern associated with said given type against said database of known values of that type at least in part using a data structure that has been marked to reflect at least a subset of values in said database.

14. The system of claim 13, wherein said data structure comprises a bloom filter.

15. A method, comprising:

using a processor to identify in an arbitrary log data a set of candidate data values that match a top level pattern that is common to two or more types of data value of interest;

using the processor to process said candidate data values through a plurality of successive filtering stages, each stage of which includes determining which, if any, of said candidates match a more specific pattern associated more specifically with a specific one of said types of data value of interest; classifying said candidates, if any, that match the more specific pattern as being of said corresponding specific one of said types of data value of interest; and removing from the set of candidate data values any candidate data values so identified and classified; and using the processor to generate and store a structured data record that associates each candidate data value determined to be of a corresponding one of said types of data value of interest with said corresponding one of said types of data value of interest;

wherein the processor is further used to apply one or more heuristics to more specifically classify and label one or more values determined to match a pattern associated with a specific one of said types of data value of interest; and wherein said heuristics include heuristics based on one or more of presence in the arbitrary log data of a characteristic string; placement within the log data of such a string relative to a given candidate data value; location of a given candidate data value within the arbitrary log data; and location within the arbitrary log data of a given candidate data value relative to one or more other candidate data values of the same type.

16. The method of claim 15, wherein the processor is configured to identify said set of candidate data value at least in part by applying a regular expression to text comprising said arbitrary log data.

17. The method of claim 15, wherein said arbitrary log data may include log data expressed and represented in any format.

18. A computer program product embodied in a non-transitory computer readable medium and comprising computer instructions for:

identifying in an arbitrary log data a set of candidate data values that match a top level pattern that is common to two or more types of data value of interest;

processing said candidate data values through a plurality of successive filtering stages, each stage of which includes determining which, if any, of said candidates match a more specific pattern associated more specifically with a specific one of said types of data value of interest;

classifying said candidates, if any, that match the more specific pattern as being of said corresponding specific one of said types of data value of interest; and removing from the set of candidate data values any candidate data values so identified and classified;

generating and storing a structured data record that associates each candidate data value determined to be of a corresponding one of said types of data value of interest with said corresponding one of said types of data value of interest; and applying one or more heuristics to more specifically classify and label one or more values determined to match a pattern associated with a specific one of said types of data value of interest;

wherein said heuristics include heuristics based on one or more of presence in the arbitrary log data of a characteristic string; placement within the log data of such a string relative to a given candidate data value; location of a given candidate data value within the arbitrary log data; and location within the arbitrary log data of a given candidate data value relative to one or more other candidate data values of the same type.

19. The computer program product of claim 18, further comprising computer instructions to identify said set of candidate data value at least in part by applying a regular expression to text comprising said arbitrary log data.

20. The computer program product of claim 18, wherein said arbitrary log data may include log data expressed and represented in any format.

* * * * *

UNITED STATES PATENT AND TRADEMARK OFFICE
CERTIFICATE OF CORRECTION

PATENT NO.      : 10,313,377 B2
APPLICATION NO. : 15/298150
DATED           : June 4, 2019
INVENTOR(S)     : Wei Huang et al.

Page 1 of 1

It is certified that error appears in the above-identified patent and that said Letters Patent is hereby corrected as shown below:

In the Specification

In Column 4, Line 10-15, delete "Domain Name: ((([a-zA-Z0-9]|[a-zA-Z0-9][a-zA-Z0-9\-]*[a-zA-Z0-9])\.+(XN|xn\-\-[a-zA-Z0-9 ]+| [A-Za-z+)| [A-Za-z+)" and insert
--Domain Name: ((([a-zA-Z0-9]|[a-zA-Z0-9][a-zA-Z0-9\-]*[a-zA-Z0-9])\.+(XN|xn\-\-[a-zA-Z0-9]+|[A-Za-z]+)--, therefor.

In Column 5, Line 59, delete "TIMES TAMP" and insert --TIMESTAMP--, therefor.

Signed and Sealed this
Twenty-first Day of January, 2020

Andrei Iancu
*Director of the United States Patent and Trademark Office*